(12) United States Patent
Parks, III

(10) Patent No.: US 11,598,069 B2
(45) Date of Patent: Mar. 7, 2023

(54) MICRODREDGING SYSTEM AND METHOD OF USING THE SAME

(71) Applicant: Coolfish Robotics LLC, Bingen, WA (US)

(72) Inventor: Francis Newton Parks, III, Bingen, WA (US)

(73) Assignee: Coolfish Robotics LLC, Bingen, WA (US)

( * ) Notice: Subject to any disclaimer, the term of this patent is extended or adjusted under 35 U.S.C. 154(b) by 731 days.

(21) Appl. No.: 16/406,408

(22) Filed: May 8, 2019

(65) Prior Publication Data

US 2019/0284781 A1   Sep. 19, 2019

Related U.S. Application Data

(63) Continuation of application No. 15/148,719, filed on May 6, 2016, now Pat. No. 10,329,735.

(60) Provisional application No. 62/159,119, filed on May 8, 2015.

(51) Int. Cl.
| | | |
|---|---|---|
| E02F 3/90 | (2006.01) | |
| E02F 3/92 | (2006.01) | |
| E02F 3/88 | (2006.01) | |
| E02F 7/04 | (2006.01) | |
| E02F 9/20 | (2006.01) | |
| E02F 7/06 | (2006.01) | |
| G01S 19/14 | (2010.01) | |

(52) U.S. Cl.
CPC ............ *E02F 3/9268* (2013.01); *E02F 3/885* (2013.01); *E02F 3/905* (2013.01); *E02F 3/907* (2013.01); *E02F 3/9256* (2013.01); *E02F 3/9262* (2013.01); *E02F 7/04* (2013.01); *E02F 7/065* (2013.01); *E02F 9/205* (2013.01); *E02F 9/207* (2013.01); *E02F 9/2054* (2013.01); *G01S 19/14* (2013.01)

(58) Field of Classification Search
CPC ......... E02F 3/9256; E02F 3/885; E02F 3/907; E02F 7/04
See application file for complete search history.

(56) References Cited

U.S. PATENT DOCUMENTS

| | | | | |
|---|---|---|---|---|
| 4,232,903 A | * | 11/1980 | Welling | E21C 50/00 299/8 |
| 5,037,486 A | * | 8/1991 | Sloan | B08B 9/0933 134/18 |
| 6,497,535 B1 | * | 12/2002 | Thomas | B63B 35/305 114/34 |
| 7,181,871 B2 | * | 2/2007 | Sower | A01C 3/04 37/317 |
| 7,892,438 B2 | * | 2/2011 | Nielsen | E02F 3/9243 210/747.6 |
| 9,297,142 B2 | * | 3/2016 | Winkelman | E02F 9/067 |
| 10,030,359 B2 | * | 7/2018 | Van Rompay | E02F 3/907 |
| 10,035,574 B2 | * | 7/2018 | Montgomery | E02F 3/8841 |
| 10,060,093 B2 | * | 8/2018 | Linner | B62D 55/06 |
| 11,047,771 B2 | * | 6/2021 | Wright | E21B 25/00 |

(Continued)

*Primary Examiner* — Gary S Hartmann
(74) *Attorney, Agent, or Firm* — Berkeley Law & Technology Group, LLP

(57) ABSTRACT

Microdredging systems comprising a pumping platform and loading platform. In certain embodiments, system operates autonomously and is adapted to allow the loading platform undock from the pumping platform for disposal of the removed sediment.

20 Claims, 15 Drawing Sheets

(56) References Cited

U.S. PATENT DOCUMENTS

| | | | |
|---|---|---|---|
| 11,162,240 B2* | 11/2021 | Bath | C23F 13/20 |
| 2001/0032809 A1* | 10/2001 | Henkin | E04H 4/1654 |
| | | | 210/143 |
| 2010/0005857 A1* | 1/2010 | Zhang | B63C 13/00 |
| | | | 73/29.02 |
| 2014/0190904 A1* | 7/2014 | Sewell | E02F 3/9268 |
| | | | 210/768 |

* cited by examiner

MICRODREDGING SYSTEM AND METHOD OF USING THE SAME

FIELD

The present disclosure relates to a microdredging system comprising one or more buoyant platforms that are adapted to remove sediment from below the surface of a body of water.

BACKGROUND

Methods of dredging a body of water often implement the use of large piece of excavation equipment supported on a barge and requiring the use of one or more onboard operators. These methods are often expensive and can only be accomplished at depths at which the excavator can reach. Other types of dredging systems implement the use of barges that also require the use of one or more onboard operators and periodic, expensive implementation. In addition, most systems are limited in that operations must be ceased when the platform is loaded with sediment, requiring the entire system to be moved to the nearest accessible land or distant aquatic dumping grounds for offloading. Accordingly, there remains a need to develop dredging systems that are relatively inexpensive and are capable of a continuous operating schedule that does not necessarily require the constant presence of onboard operators.

SUMMARY

Described herein is a system comprising:
a buoyant pumping platform comprising at least one suction device adapted to deploy to a detected location below a surface of a body of water where sediment is located, and raise the sediment;
a location device adapted to determine the detected location; and
a buoyant loading platform adapted to engage with the buoyant pumping platform, wherein said loading platform is adapted to receive the raised sediment.

Also described herein is a method comprising:
delivering a microdredger system to a primary site on a surface of a body of water, said microdredger system comprising a buoyant loading platform, a buoyant pumping platform, at least one suction device, and a location device;
providing a detected location of sediment below the surface of the body of water through the use of the location device;
deploying the at least one suction device to the detected location;
raising the sediment from the detected location via the at least one suction device;
loading the raised sediment onto the buoyant loading platform;
moving the buoyant loading platform to a secondary site; and
discharging the raised sediment from the buoyant loading platform.

DETAILED DESCRIPTION

Figure 1:
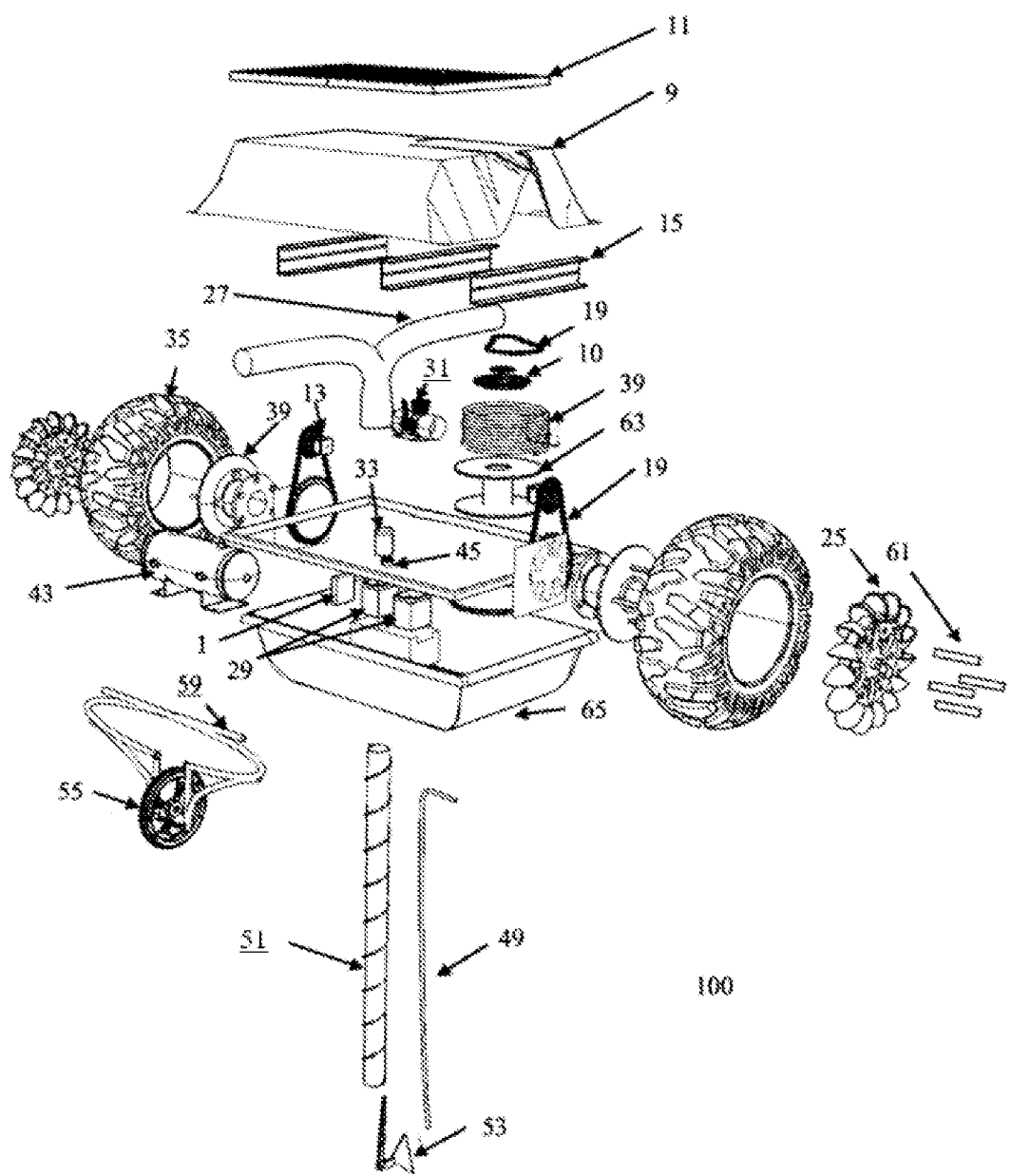
FIG. 1 is an exploded view of an exemplary pumping platform.
Figure 2:
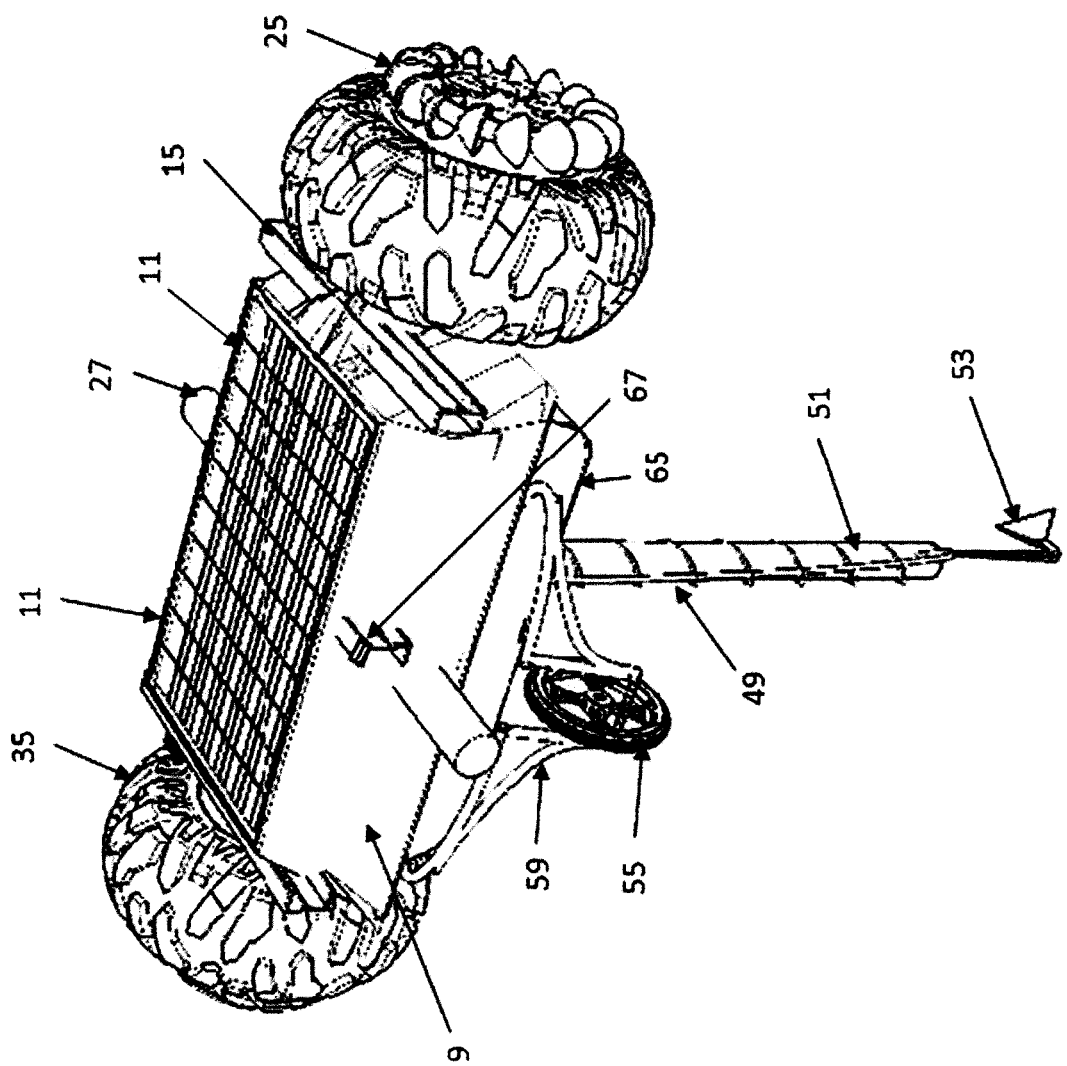
FIG. 2 is a perspective illustration of an exemplary pumping platform.
Figure 3:
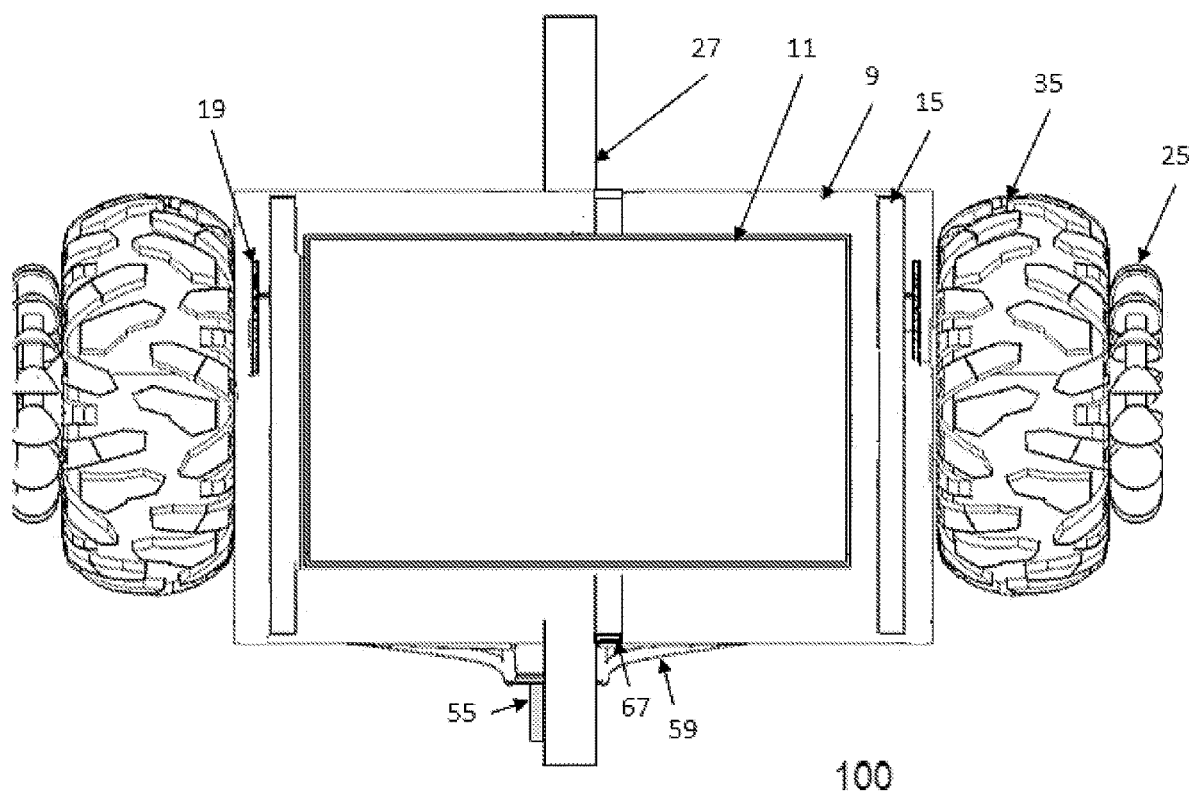
FIG. 3 is a top view of an exemplary pumping platform.

The following is a description of exemplary microdredging systems and components thereof. The embodiments described herein are exemplary in nature and are not intended to be limited in structure or application.

As used in this specification and the appended claims, the articles "a," "an," and "the" include plural referents unless expressly and unequivocally limited to one referent.

Described herein is a system comprising:
a buoyant pumping platform comprising at least one suction device adapted to deploy to a detected location below a surface of a body of water where sediment is located, and raise the sediment;
a location device adapted to determine the detected location; and
a buoyant loading platform adapted to engage with the buoyant pumping platform, wherein said loading platform is adapted to receive the raised sediment.

Also described herein is a method comprising:
delivering a microdredger system to a primary site on a surface of a body of water, said microdredger system comprising a buoyant loading platform, a buoyant pumping platform, at least one suction device, and a location device;
providing a detected location of sediment below the surface of the body of water through the use of the location device;
deploying the at least one suction device to the detected location;
raising the sediment from the detected location via the at least one suction device;
loading the raised sediment onto the buoyant loading platform;
moving the buoyant loading platform to a secondary site; and
discharging the raised sediment from the buoyant loading platform.

In certain embodiments, the buoyant loading platform is adapted to dock and undock from the buoyant pumping platform. In certain embodiments, the buoyant loading platform is adapted to dock and undock from the buoyant pumping platform through the use of one or more electromagnets. In certain embodiments, the buoyant pumping platform is adapted to trigger the operation of the suction device upon the docking of the buoyant loading platform. In certain embodiments, the buoyant loading platform comprises a load sensor. In certain embodiments, the load sensor comprises a weight sensor or a buoyancy sensor. In certain embodiments, the load sensor is adapted to determine a capacity of the buoyant loading platform for receiving the sediment. In certain embodiments, the buoyant loading platform is adapted to undock from the buoyant pumping platform as determined by the load sensor. In certain embodiments, the buoyant loading platform is adapted to transport the sediment to a remote site after undocking from the buoyant pumping platform. In certain embodiments, the buoyant loading platform is adapted to transport the sediment to a remote site through the use of a locomotion system. In certain embodiments, the locomotion system comprises at least one of a propeller system, a wheel system, a track system, or jet propulsion.

In certain embodiments, the location device comprises at least one of an echo sounder, a remote controller, or a GPS locater. In certain embodiments, the buoyant pumping platform comprises a motion system. In certain embodiments, the motion system comprises at least one of a propeller system, a wheel system, a track system, or jet propulsion. In certain embodiments, the motion system comprises a wheel system. In certain embodiments, the motion system comprises a paddle structure.

In certain embodiments, the at least one suction device comprises a suction hose. In certain embodiments, the at least one suction device comprises an air hose. In certain embodiments, the air hose is connected to a spool, wherein the spool is adapted to coil and uncoil the air hose. In certain embodiments, the suction hose is adapted to coil, retract, collapse, or telescope. In certain embodiments, the suction hose associated the air hose. In certain embodiments, the suction hose is connected to the air hose. In certain embodiments, the spool is adapted to deploy the suction hose to the detected depth via the uncoiling of the air hose. In certain embodiments, the suction device comprises an air compressor. In certain embodiments, the compressor is adapted to provide compressed air to the air hose. In certain embodiments, the air hose comprises an auger spike. In certain embodiments, the auger spike is adapted to loosen the sediment at the detected depth via agitation. In certain embodiments, the auger spike is adapted to be agitated by an action created by the spool. In certain embodiments, the suction hose is adapted to remove sediment from the detected depth via air bubbles from the compressed air provided by the air hose.

In certain embodiments, the pumping platform comprises a sediment exit tube. In certain embodiments, the sediment exit tube is adapted to deliver sediment to the buoyant loading platform. In certain embodiments, the pumping platform is adapted to deliver sediment to the buoyant loading platform. In certain embodiments, the sediment is wet. In certain embodiments, the buoyant loading platform is adapted to separate water from sediment. In certain embodiments, the buoyant loading platform comprises a screening system. In certain embodiments, the buoyant loading platform comprises a silt screen.

In certain embodiments, the buoyant loading platform is adapted to discharge the sediment in an aquatic environment or a terrestrial environment. In certain embodiments, the buoyant loading platform is adapted to discharge the sediment via a bucket system. In certain embodiments, the buoyant loading platform is adapted to discharge the sediment via a clamshell mechanism. In certain embodiments, the loading platform comprises a bagging or blocking system that allows for the collection of sediment. In certain embodiments, the system is adapted to form bricks/blocks from the reclaimed sediment, thus providing a "green" alternative to simple sediment disposal.

In certain embodiments, the system further comprises at least one power source. In certain embodiments, the at least one power source comprises one or more of a battery, a generator, and a photovoltaic device. In certain embodiments, the buoyant loading platform is adapted to locate the buoyant pumping platform for docking. In certain embodiments, the buoyant loading platform is adapted to locate the buoyant pumping platform for docking via communications with one or more controllers.

FIGS. 1-6 provide details regarding the structure of an exemplary buoyant pumping platform 100. The buoyancy of the pumping platform may be effected by any suitable means known to those of skill in the art, including the use of materials such as foam/styrofoam, air bladders, plastics, and/or hull-type water displacement structures. Floatation of exemplary pumping platform 100 is accomplished in part by housing 65 and tires 35. Housing 65 contains battery(ies) 29, microcontroller housing 17, transducer 45, and transducer housing 33. A microcontroller is contained in microcontroller housing 17. The primary components of the suction device are also contained in housing 65, including air tank 43, compressor 31, air hose 49, air hose spool 63, chain 19, sprocket 23, and bearing plate 69. Suction hose 51, auger spike 53 and the distal end of air hose 49 are located for primary operation below housing 65.

Pumping platform 100 operates primarily through microcontroller 21 (a "controller"), which is connected to transducer 45. Transducer 45 serves as a location device that is capable of determining when and where the system will operate. In certain embodiments transducer 45 comprises an echo sounder, which operates by using echo pulses to determine the depth/location of detected sediment below the surface for removal. In certain embodiments, transducer 45 may comprise 3-dimensional mapping technology. Information gathered from transducer 45 will determine whether pumping platform 100 stays to pump sediment at a particular location, or continues searching for sediment removal targets. Data gathered by transducer 45 is relayed to the microcontroller contained in housing 17, which communicates with stepper motors 13 to set the location of pumping platform 100 and activate the suction device, respectively.

More specifically, in certain embodiments data received from the microcontroller is relayed to stepper motors 13 to direct the motion of pumping platform 100. In certain embodiments, the movement and location of pumping platform 100 can be accompanied with loading platform 200 docked. Alternatively, the locomotion of pumping platform 100 and loading platform 200 can be accomplished independently, wherein loading platform 200 docks to pumping platform 100 subsequent to detection and location of a desired sediment removal target. Relaying of data to stepper motor(s) 13 will set hub chain(s) 19 into motion, which will transfer power to hub(s) 39 and wheel(s) 35. Movement of the platform may be enhanced by attaching paddle(s) 25 to the wheel system via lug nut extensions 61.

Figure 4:
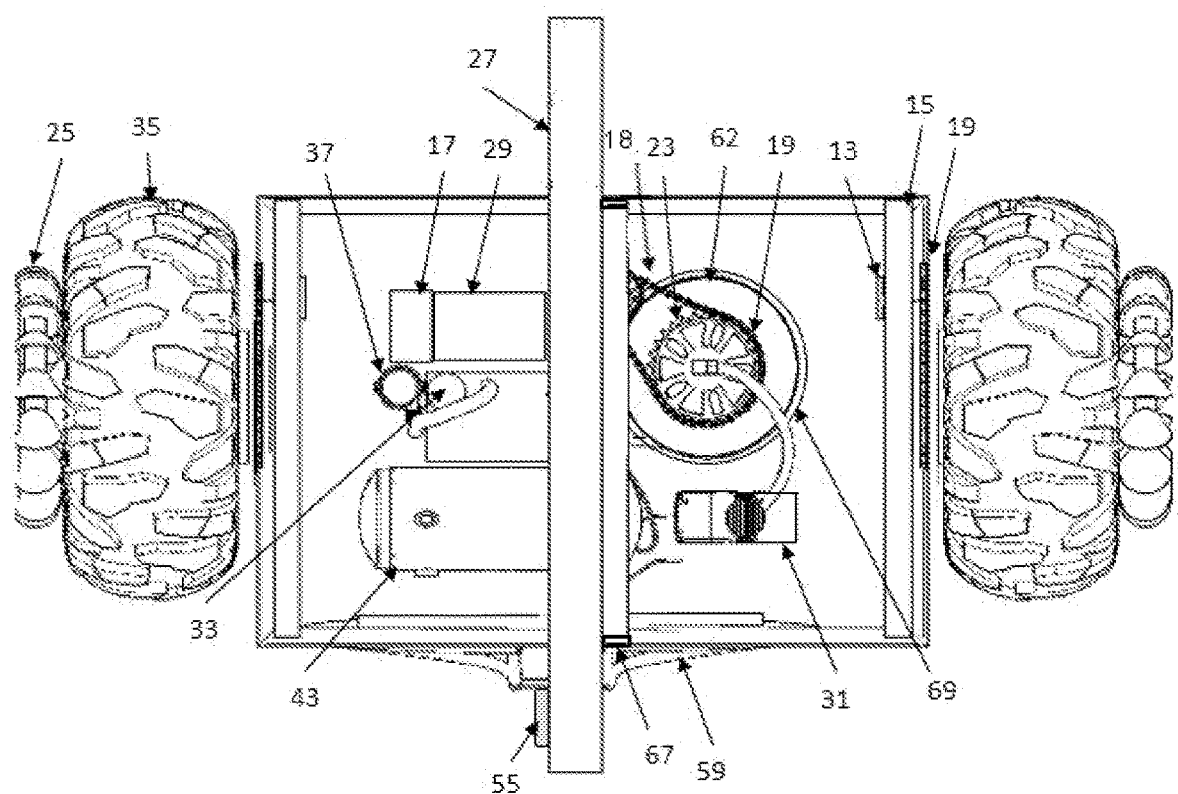
FIG. 4 is a top view of an exemplary pumping platform with the top panel/cover removed.
Figure 5:
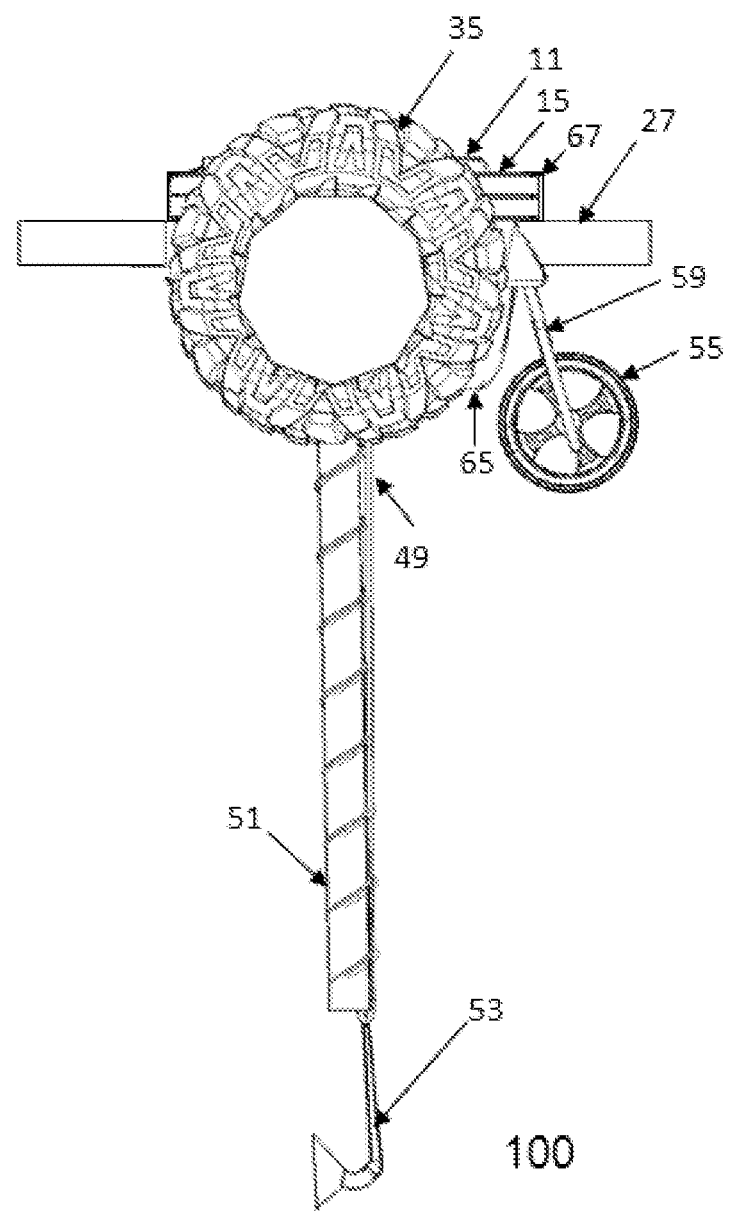
FIG. 5 is a side view of an exemplary pumping platform.
Figure 6:
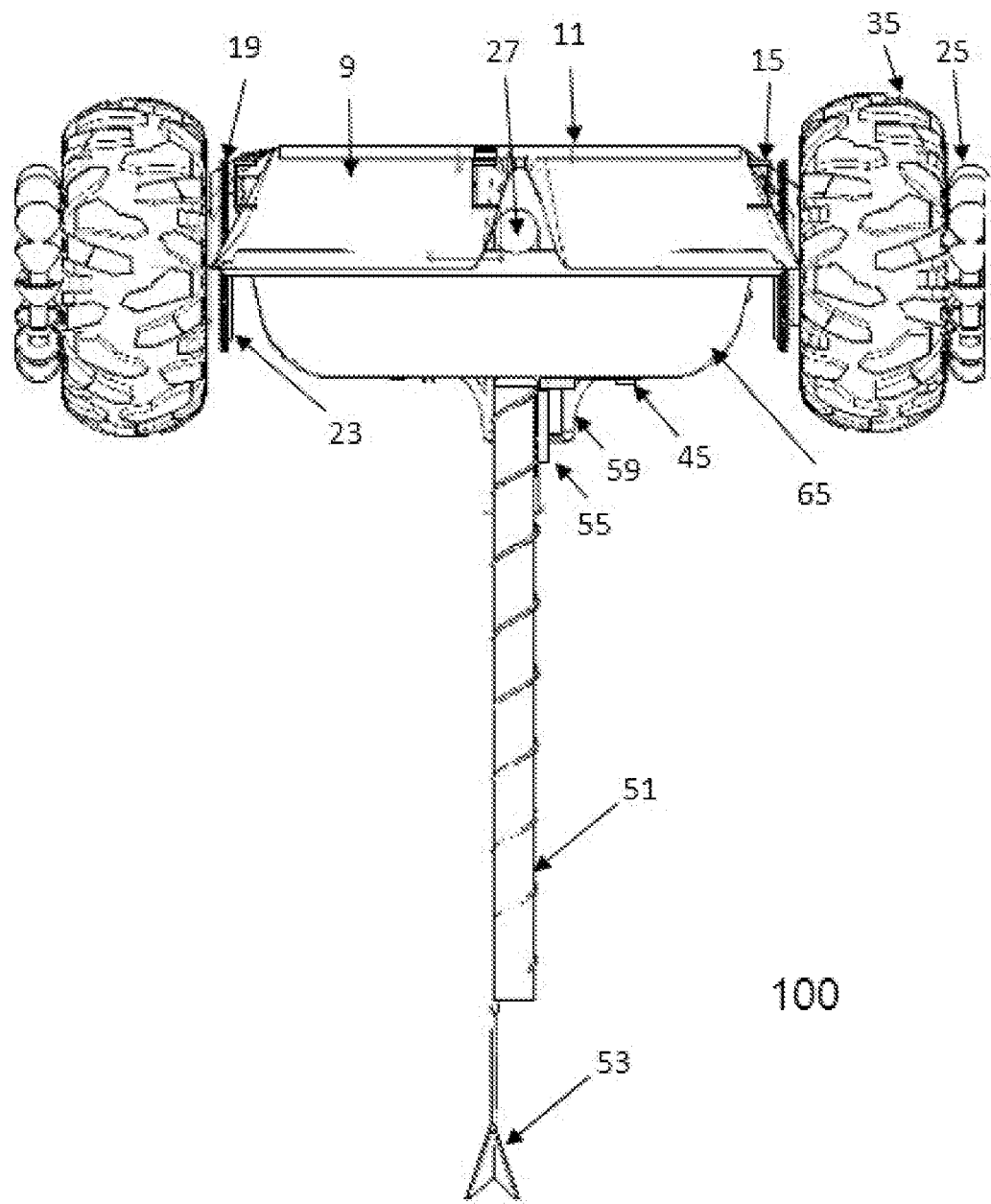
FIG. 6 is a front view of an exemplary pumping platform.

Data received/processed by the microcontroller may also direct the operation of the suction system. With particular reference to FIG. 4, the microcontroller will initiate the operation of stepper motor 18, which transfers motion to sprocket 23 via chain 19. Sprocket 23 is connected to air hose spool 63, which rests on bearing plate 69. Rotation of air hose spool 63 will unwind and release the desired length of air hose 49, which extends below through an aperture in housing 65. Suction hose 51 is attached to the bottom of housing 65 and is in fluid communication with exit tube 27.

Suction hose 51 may comprise any suitable material, and is retractable, expandable and/or telescoping in nature. The proximal end of suction hose 51 is connected to housing 65. Air hose 49 is attached alongside suction hose 51, such that the release of a length of air hose 49 from air hose spool 63 will deploy suction hose 51 below the surface of the water and towards a sediment removal target. Auger spike 53 will "anchor" the distal end suction hose 51 on the desired sediment target. The proximal end of air hose 43 is in fluid communication with air tank 43, which will provide pressurized air to the air hose upon deployment of suction hose 51. The distal end of air hose 49 is situated to provide pressurized air towards the distal end of suction hose 51 and auger spike 53. Turbulence created by the air hose/exiting air will loosen sediment, aided partially by movement of auger spike 53, and send a stream of air bubbles into the distal end of suction hose 51. The rush of bubbles up through suction hose 51 creates lift and, thus, the suction of water and sediment up though suction hose 51 and into exit tube 27. As shown, in certain embodiments exit tube 27 is adapted to have at least two exit apertures, allowing loading platform 200 to dock from either side of pumping platform 100. A switching valve can be implemented to switch flow of water and sediment though exit tube 27 to the side the loading platform docks.

Figure 9:
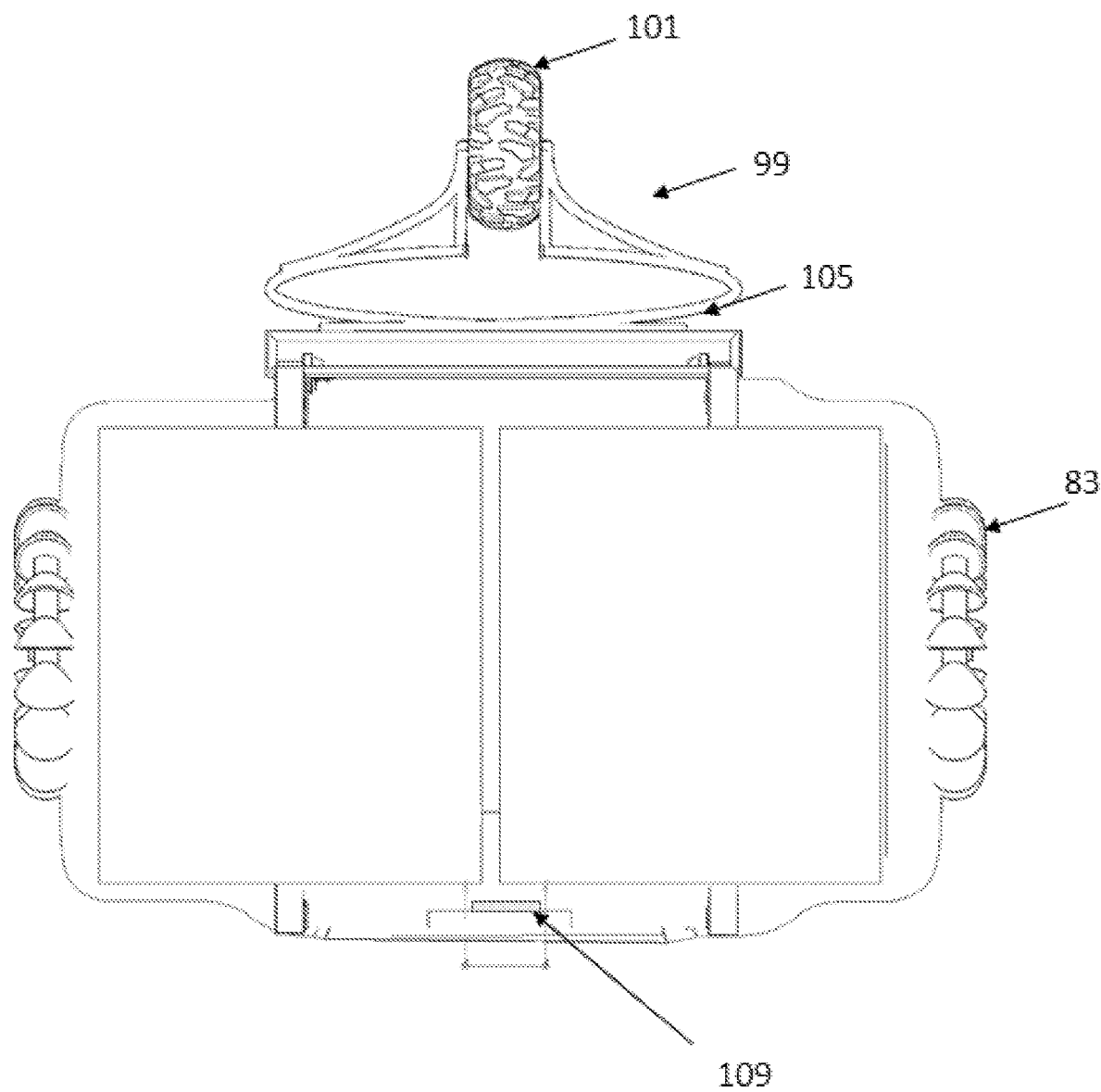
FIG. 9 is a top view of an exemplary loading platform.

Operation of the suction device can be accomplished according to any suitable methods according to those of skill in the art. In certain embodiments, the charging of air tank 43 with air is accomplished by compressor 31. The operation of compressor 31 may be initiated by the docking of loading platform 200 to pumping platform 100. In certain embodiments, the docking of loading platform 200 to pumping platform 100 will trigger reed switch 67, which will signal microcontroller 21 to turn on compressor 31 and initiate pumping/suction. Alternatively, or in addition, reed switch 109 may be placed on loading platform 200 (see FIG. 9).

Additional components of pumping platform 100 include trailing wheel frame 59 and trailing wheel 55, which can provide stability to the pumping platform in water and when a terrestrial environment is encountered. Bilge pump 37 can be used to remove any water that collects at the bottom of housing 65. Framing 15 is implemented to support cover 9, which mates to housing 65 and provides protection to the suction device and other mechanical/electrical components of the pumping platform. Solar panel(s) 11 may be affixed to the outer surface of cover 9 to provide power to the system via the charging of batteries 29. Batteries 29 may be used to power the entire system, including any necessary microcontrollers, transducers, and stepper motors.

Figure 7:
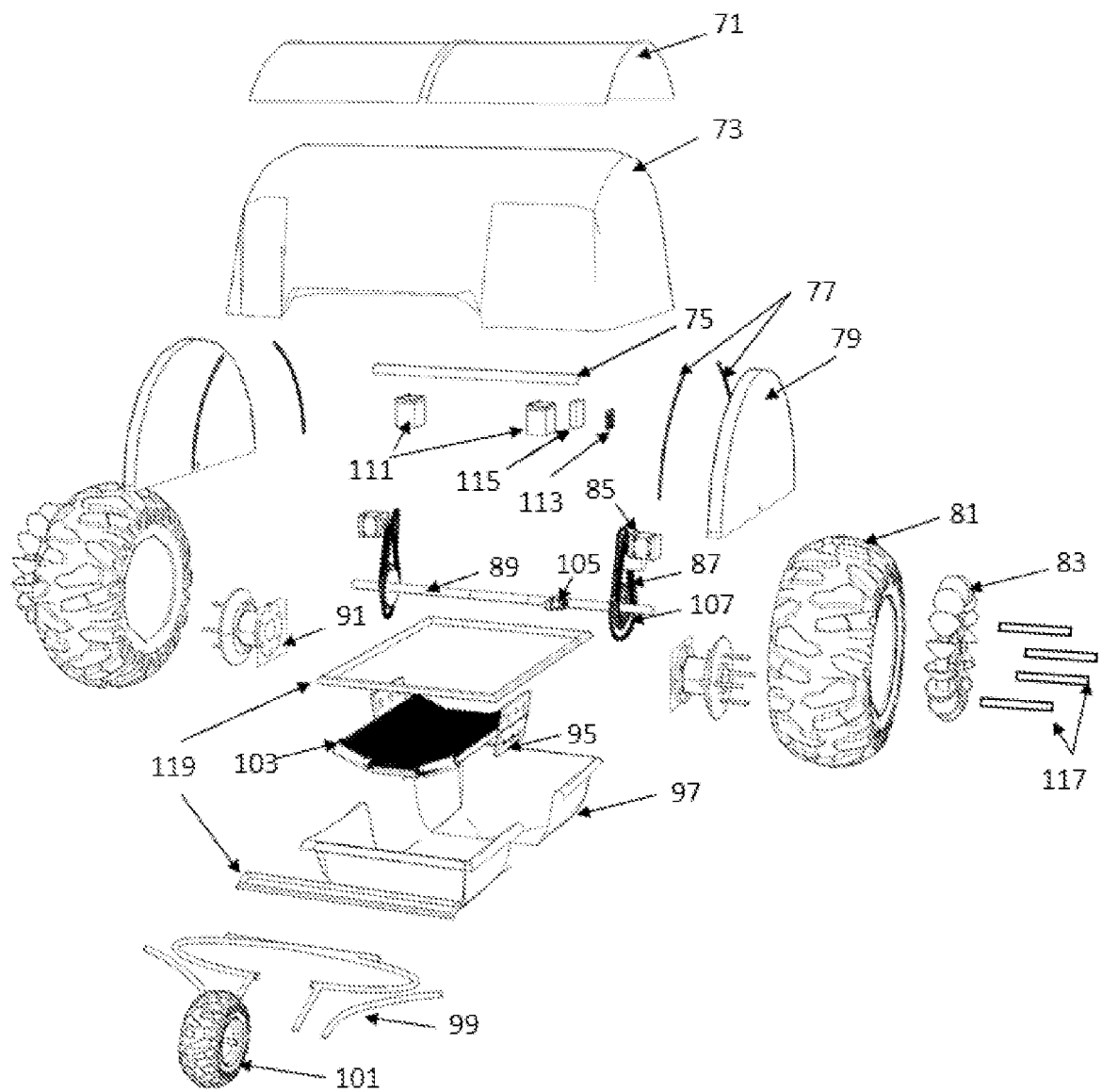
FIG. 7 is an exploded view of an exemplary loading platform.
Figure 8:
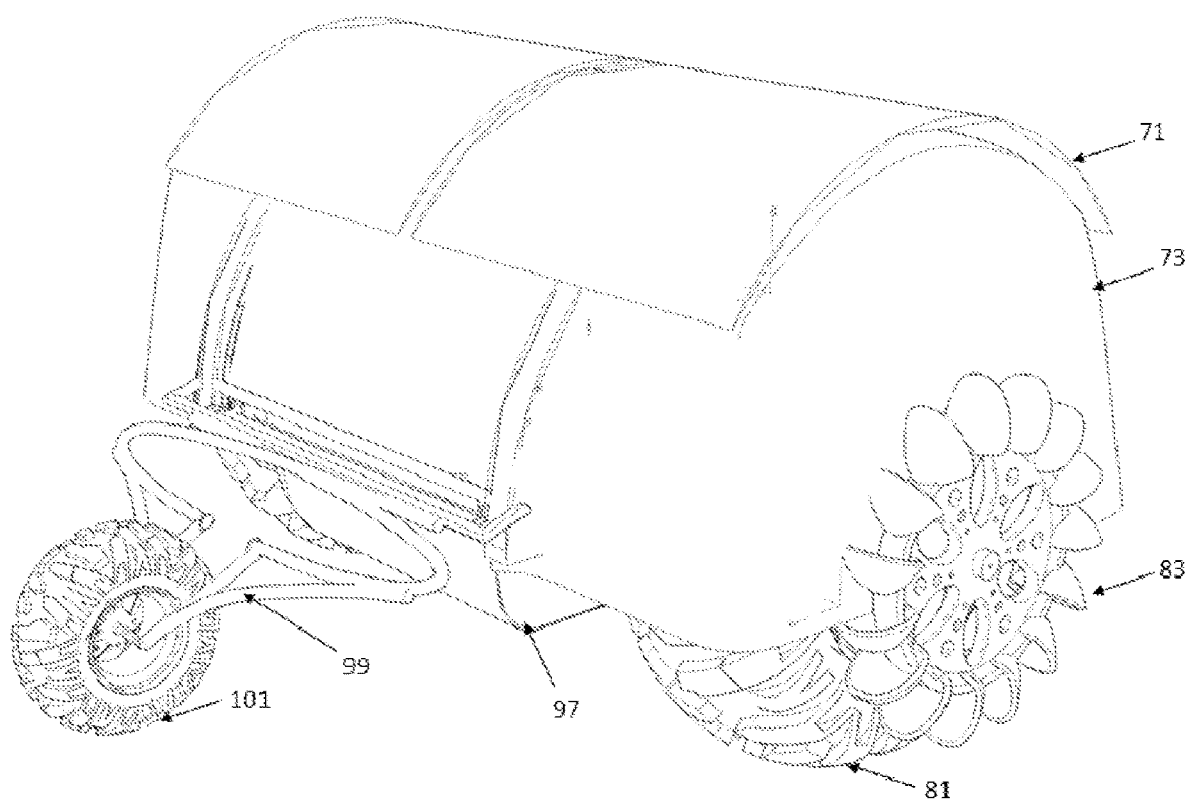
FIG. 8 is a perspective illustration of an exemplary loading platform

FIGS. 7-13 illustrate exemplary buoyant loading platform 200 that is adapted to receive sediment from pumping platform 100. The buoyancy of loading platform 200 may be effected by any suitable means known to those of skill in the art, including the use of materials such as foam/styrofoam, air bladders, plastics, and/or hull-type structures. Floatation of exemplary loading platform 200 is accomplished in part by tires 81. Cover 73 covers the contents of pumping platform 200, including the battery(ies) 111, microcontroller housing 115, microcontroller 113, drivetrain stepper motor(s) 85, drive chain(s) 87 and sprocket(s) 107 associated with axle 89. Also included, per FIG. 7, are pinion track 77, stepper bearing(s) 105 (floating in space), silt screen 103, silt screen frame 95, and bucket 97. Panel(s) 79, bar 75, and frame pieces 119 provide stabilization and support to loading platform 200. Photovoltaic panel 71 may be affixed to cover 73 to provide power/recharging to batteries 111.

Loading platform 200 operates primarily through microcontroller 113 (a "controller"), which is communication with drivetrain stepper motor(s) 85. Microcontroller 113 can provide commands to motor(s) 85, which can activate the drivetrain axle 89 via chains 87 and sprockets 107. Power is transferred from axle 89 to hub(s) 91, which effect locomotion of the platform via tire(s) 81 and paddle wheel(s) 83 affixed by lugnut extensions 117. Trailing wheel 101 is affixed by frame 99, which may provide further support to the locomotion of platform 200 on land or in the water.

Figure 10:
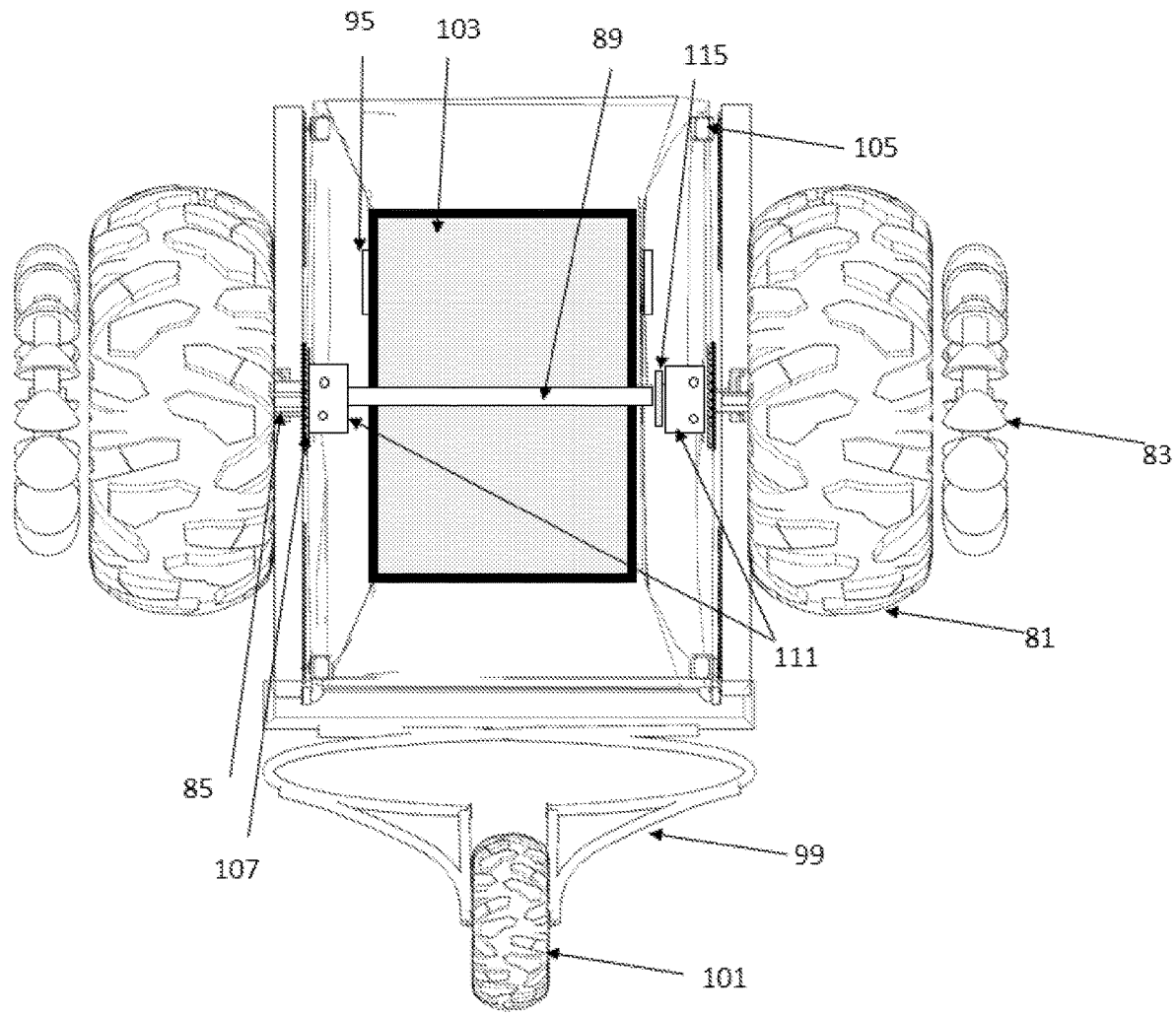
FIG. 10 is a top view of an exemplary loading platform with top panel/cover removed.
Figure 11:
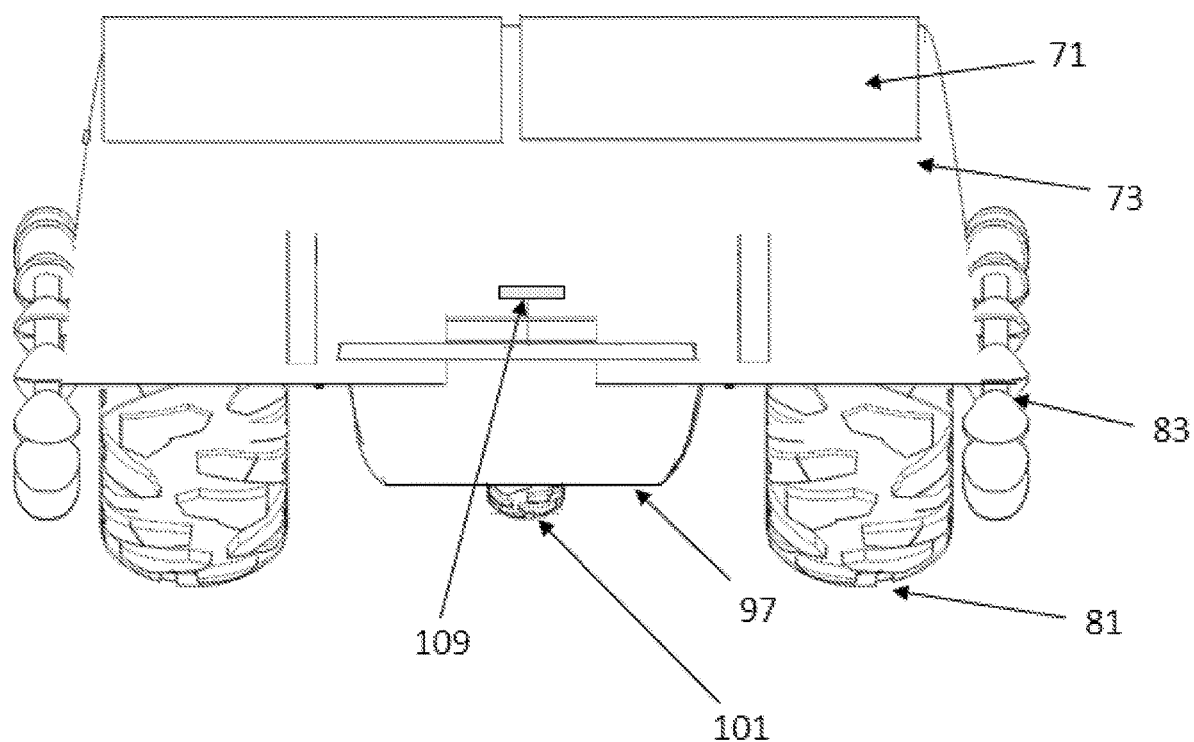
FIG. 11 is a rear view of an exemplary loading platform.
Figure 12:
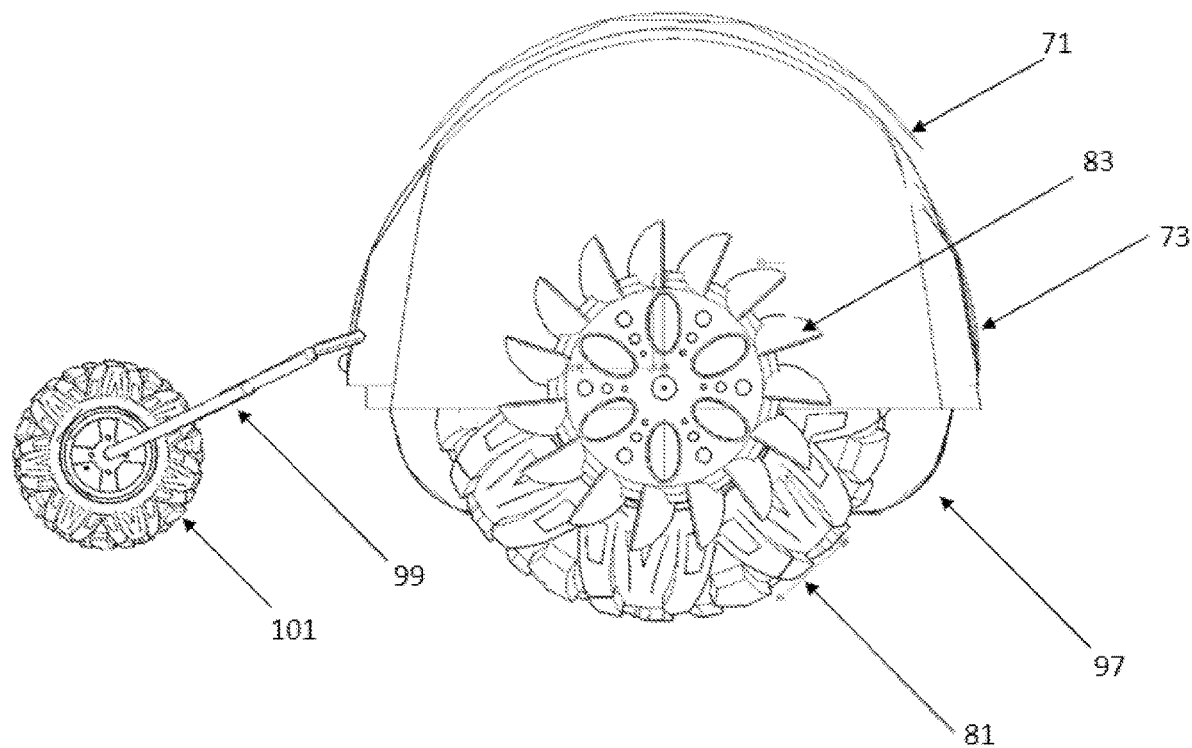
FIG. 12 is a side view of an exemplary loading platform.
Figure 13:
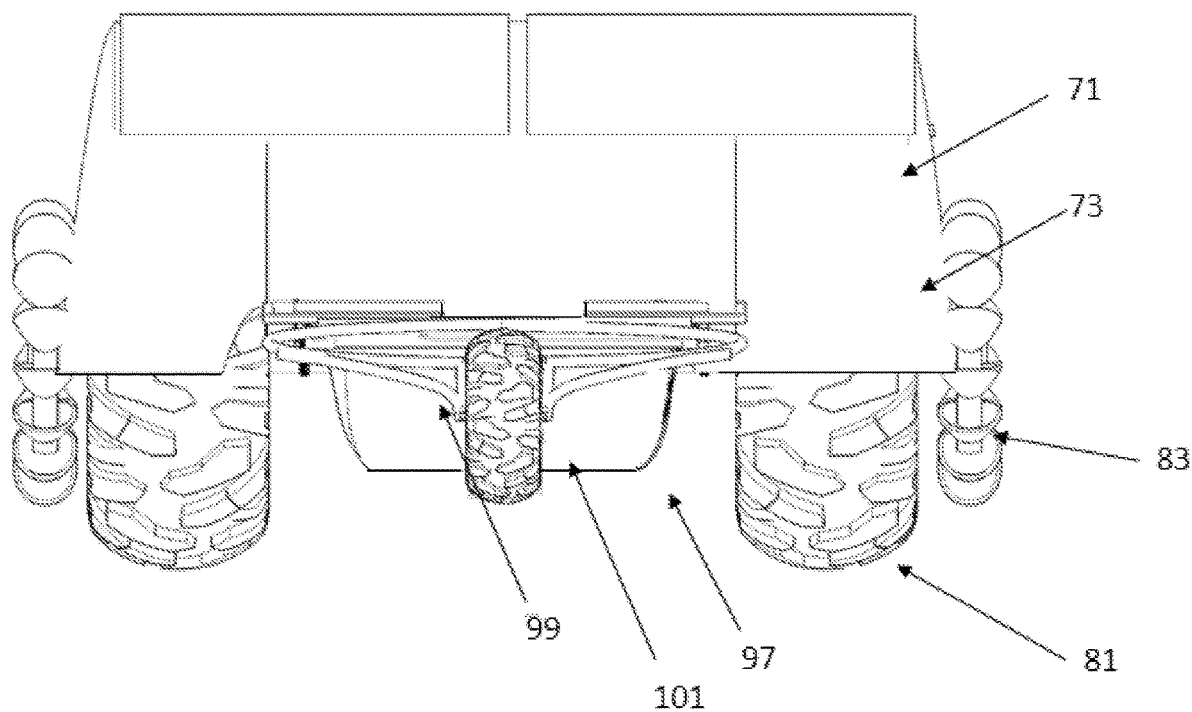
FIG. 13 is a front view of an exemplary loading platform.

Upon docking to pumping platform 100, loading platform 200 may receive wet sediment from exit tube 27 via an aperture in cover 73. With particular reference to FIG. 10, wet sediment will enter the interior of loading platform 200 where it is introduced to silt screen 103. Solids are collected on the silt screen, while water is free to pass below to bucket 97. As seen in FIG. 7, bucket 97 may comprise two ½ shells. These ½ shells may be adapted to where they are not water tight when in the closed position, thereby allowing water that collects in bucket 97 from the silt screen to pass back into the aquatic environment. Load sensors may be implemented to communicate with microcontroller 113 when the loading platform is filled to capacity. Upon doing so, the microcontroller of the loading platform and/or pumping platform can instruct loading platform 200 to undock from pumping platform 100, and mobilize the drivetrain of the loading platform to head to the desired location for unloading.

Figure 14:
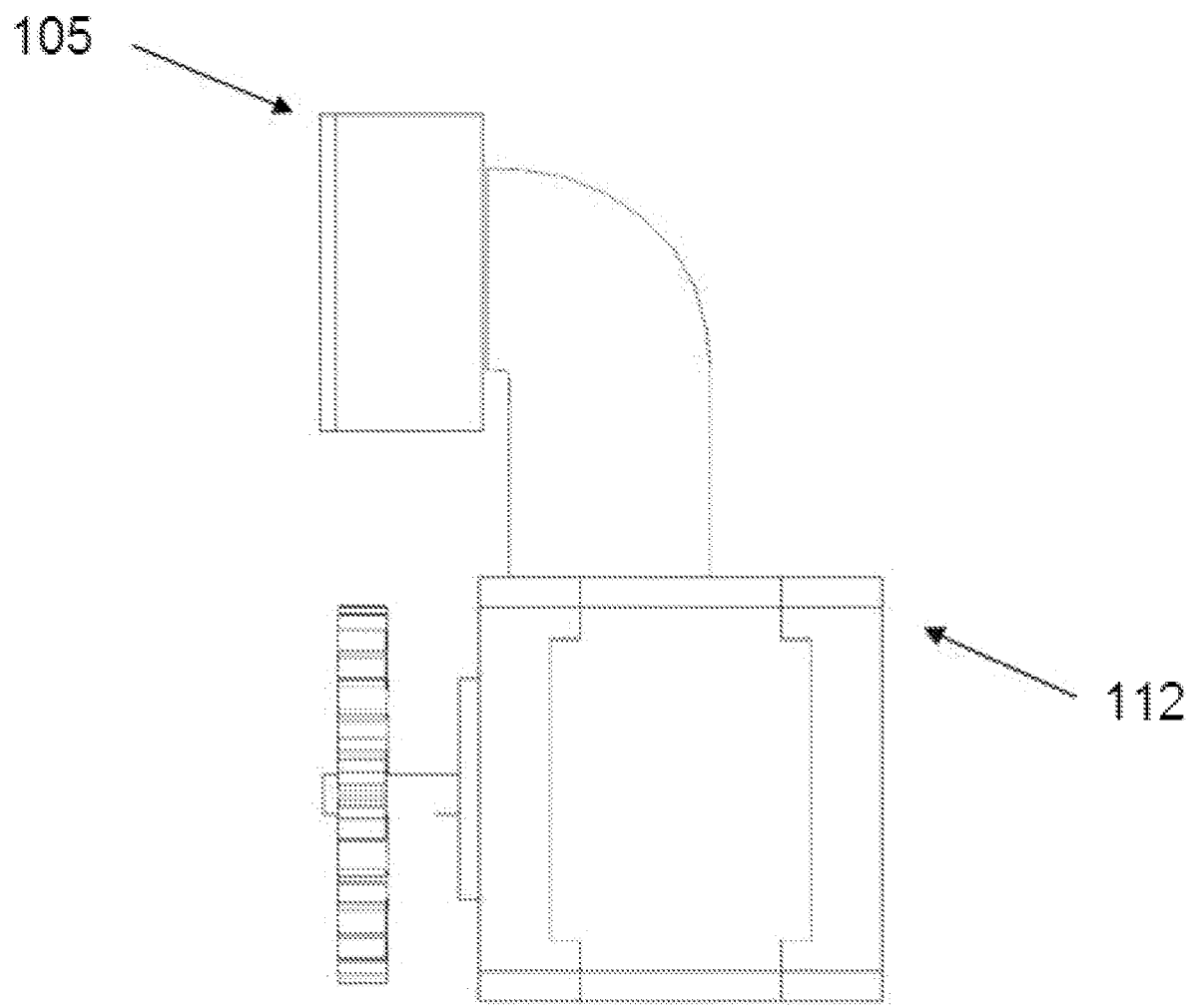
FIG. 14 is a side view of a pinion stepper with roller.

Unloading of solids from loading platform 200 may occur at an aquatic or terrestrial location (a secondary site) away from the sediment removal. Unloading of the sediment collected on silt screen 103 is accomplished primarily by pinion stepper motors (not shown in FIG. 7) located at each corner of bucket 97. An exemplary pinion stepper 112 is shown in FIG. 14, which is associated with pinion bearing(s) 105. As shown in FIG. 10, pinion bearing(s) 105 are associated with the corners of bucket 97. Upon receiving commands to dump from microcontroller 113, the pinion steppers will "climb" the arc of pinion track 77, resulting in the opposing rotational motion of the ends of the two ½ shells of bucket 97. Thus, bucket 97 opens via a "clamshell" mechanism. Silt screen 103, fastened to bucket 97 via silt screen frame 95, will mimic the motion of the opening bucket, such that the collected sediment will slide off the silt screen and down through the open bucket to the desired dump site.

Figure 15:
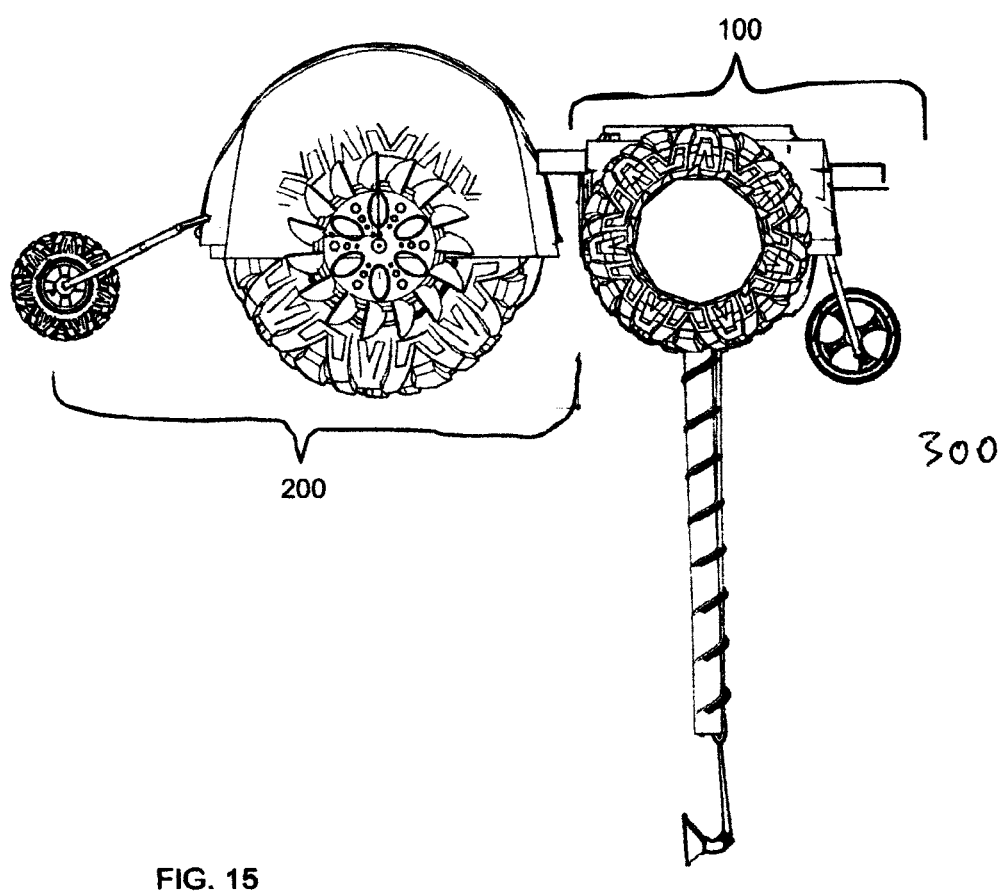
FIG. 15 is a side view of an exemplary microdredging system comprising a loading platform docked to a pumping platform.

FIG. 15 demonstrates an exemplary microdredger with loading platform 200 docked to pumping platform 100. As noted above, the operation of the individual platforms may be determined by commands received from one or more microcontrollers. In certain embodiments, the controllers of the loading platform and the pumping platform can be in communication with each other, such as by wireless communication (e.g., radio frequency via antennae). In certain embodiments, the controllers on either platform can send and receive operation commands from the other. In certain embodiments, the controller on the pumping platform can provide commands for both the suction device and the locomotion of the pumping platform on the surface of the water, while in another embodiment separate controllers can provide those respective commands. In certain embodiments, operation of the suction device may be initiated from a command received from the pumping platform controller, which is triggered by a signal received by the docking of the loading platform to the pumping platform.

In certain embodiments, the operation of the system may be determined by commands received from an offsite location, i.e., not the primary location of sediment removal. For example, in certain embodiments the operation of the system is determined by an offsite beacon controller. In certain embodiments, the beacon controller may be placed in a location nearby to the pumping operation, such as a sediment discharge site (i.e., secondary site). In certain embodiments, locomotion, pumping, undocking, and the location of sediment discharge can all be controlled by commands received from a primary beacon controller. In certain embodiments, the pumping platform and loading platform may each comprise a controller associated with a battery and antenna, thereby allowing three-way communication between platforms and the beacon controller. This will allow for platforms to recognize the location of each other at all times, thereby allowing for the determination of a new sediment target and the re-docking of the loading platform to the pumping platform. The beacon controller can contain preset commands, or receive commands from another offsite source (e.g., communications received from a mobile device or computer via WiFi and/or LTE). Communication with the system may take place by any suitable wired or wireless communication methods known to those of skill in the art, including satellite, GPS, infrared, Bluetooth, and/or WiFi. In certain embodiments, one or more microdredgers can receive continuous commands from the beacon controller, hypothetically allowing the devices to operate autonomously 24 hours/day.

In other embodiments, the microdredging system may receive commands directly from an offsite or onsite control center, such as a remote control, computer system, or a mobile device comprising software designed to interface with the controllers and onboard electronics of the pumping platform and the loading platform. In this embodiment, the system would not require intermediate communications through a beacon controller.

In other embodiments, the system may operate autonomously, wherein the commands provided by the controllers are determined by an onboard software and electronics system that relies on input from various external sensors (e.g., load sensors, location devices, docking sensors, etc.). In certain embodiments, the system may operate semi-autonomously, wherein at least some system commands are determined by communications received from an independent source such as control center and/or a beacon controller.

The foregoing descriptions and embodiments have been provided for purposes of illustration. They are not intended to be exhaustive or limit the scope of what is described and/or claimed herein.

Additional Embodiments

A system comprising:
a buoyant pumping platform comprising at least one suction device adapted to deploy to a detected location below a surface of a body of water where sediment is located, and raise the sediment;
a location device adapted to determine the detected location; and
a buoyant loading platform adapted to engage with the buoyant pumping platform, wherein said loading platform is adapted to receive the raised sediment.

The system according to embodiment 1, wherein the buoyant loading platform is adapted to dock and undock from the buoyant pumping platform.

The system according to any one of embodiments 1-2, wherein the buoyant loading platform is adapted to dock and undock from the buoyant pumping platform through the use of one or more electromagnets.

The system according to any one of embodiments 1-3, wherein the buoyant pumping platform is adapted to trigger the operation of the at least one suction device upon the docking of the buoyant loading platform.

The system according to any one of embodiments 1-4, wherein the buoyant loading platform comprises a load sensor.

The system according to embodiment 5, wherein the load sensor comprises a weight sensor or a buoyancy sensor.

The system according to any one of embodiments 5-6, wherein the load sensor is adapted to determine a capacity of the buoyant loading platform for the raised sediment.

The system according to embodiment 7, wherein the buoyant loading platform is adapted to undock from the buoyant pumping platform upon reaching the capacity.

The system according to any one of embodiments 2-8, wherein the buoyant loading platform is adapted to transport the sediment to a remote site after undocking from the buoyant pumping platform.

The system according to any one of embodiments 1-9, wherein the buoyant loading platform is adapted to transport the sediment to a remote site through the use of a locomotion system.

The system according to embodiment 10, wherein the locomotion system comprises at least one of a propeller system, a wheel system, a paddle system, a track system, or jet propulsion.

The system according to any one of embodiments 1-11, wherein the location device comprises at least one of an echo sounder, a remote controller, or a GPS locater.

The system according to any one of embodiments 1-12, wherein the buoyant pumping platform comprises a motion system.

The system according to embodiment 13, wherein the motion system comprises at least one of a propeller system, a wheel system, a paddle system, a track system, or jet propulsion.

The system according to any one of embodiments 13-14, wherein the motion system comprises a wheel system.

The system according to embodiment 15, wherein the wheel system comprises a paddle structure.

The system according to any one of embodiments 1-16, wherein the at least one suction device comprises a suction hose.

The system according to any one of embodiments 1-17, wherein the at least one suction device comprises an air hose.

The system according to embodiment 18, wherein the air hose is connected to a spool, and wherein the spool is adapted to coil and uncoil the air hose.

The system according to any one of embodiments 18-19, wherein the suction hose is adapted to coil, retract, collapse, or telescope.

The system according to any one of embodiments 17-20, wherein the suction hose is associated the air hose.

The system according to any one of embodiments 17-21, wherein the suction hose is connected to the air hose.

The system according to any one of embodiments 19-22, wherein the spool is adapted to deploy the suction hose to the detected depth via the uncoiling of the air hose.

The system according to any one of embodiments 1-23, wherein the suction device comprises an air compressor.

The system according to embodiment 24, wherein the compressor is adapted to provide compressed air to the air hose.

The system according to any one of embodiments 18-25, wherein the air hose comprises an auger spike.

The system according to embodiment 26, wherein the auger spike is adapted to loosen the sediment at the detected location via agitation.

The system according to any one of embodiments 26-27, wherein the auger spike is adapted to be agitated by an action created by the spool.

The system according to any one of embodiments 17-28, wherein the suction hose is adapted to remove the sediment from the detected location via air bubbles from the compressed air provided by the air hose.

The system according to any one of embodiments 1-29, wherein the pumping platform comprises a sediment exit tube.

The system according to embodiment 30, wherein the sediment exit tube is adapted to deliver the raised sediment to the buoyant loading platform.

The system according to any one of embodiments 1-31, wherein the pumping platform is adapted to deliver the raised sediment to the buoyant loading platform.

The system according to any one of embodiments 1-32, wherein the raised sediment is wet.

The system according to any one of embodiments 1-33, wherein the buoyant loading platform is adapted to separate water from the raised sediment.

The system according to any one of embodiments 1-34, wherein the buoyant loading platform comprises a screening system.

The system according to any one of embodiments 1-35, wherein the buoyant loading platform comprises a silt screen.

The system according to any one of embodiments 1-36, wherein the buoyant loading platform is adapted to discharge the sediment in an aquatic environment or a terrestrial environment.

The system according to any one of embodiments 1-37, wherein the buoyant loading platform is adapted to discharge the sediment via a bucket system.

The system according to any one of embodiments 1-37, wherein the buoyant loading platform is adapted to discharge the raised sediment via a clamshell mechanism.

The system according to any one of embodiments 1-39, further comprising at least one power source.

The system according to embodiment 40, wherein the at least one power source comprises one or more of a battery, a generator, and a photovoltaic device.

The system according to any one of embodiments 1-41, wherein the buoyant loading platform is adapted to locate the buoyant pumping platform for docking.

The system according to any one of embodiments 1-42, wherein the buoyant loading platform is adapted to locate the buoyant pumping platform for docking via communications between one or more controllers.

The system according to embodiment 43, wherein the buoyant loading platform and the buoyant pumping platform each comprise at least one controller.

The system according to any one of embodiments 43 and 44, further comprising a beacon controller adapted to communicate with the controllers of the buoyant loading platform and/or the buoyant pumping platform.

The system according to any one of embodiments 1-43, wherein the buoyant loading platform comprises a bagging or blocking system that allows for the collection of the raised sediment.

A method comprising:
delivering a microdredger system to a primary site on a body of water, said microdredger comprising a buoyant loading platform, a buoyant pumping platform, at least one suction device, and a location device;
providing a detected location of sediment below the surface of the body of water through the use of the location device;
deploying the at least one suction device to the detected location;
raising the sediment from the detected location via the at least one suction device;
loading the raised sediment onto the buoyant loading platform;
moving the buoyant loading platform to a secondary site; and
discharging the raised sediment from the buoyant loading platform.

The method according to embodiment 47, wherein the buoyant loading platform is docked to the buoyant pumping platform during loading of the raised sediment.

The method according to embodiment 48, wherein buoyant loading platform is undocked from the buoyant pumping platform prior to moving to the secondary site.

The method according to any one of embodiments 47-49, wherein locomotion of the buoyant loading platform on the body of water comprises the use of commands provided by a controller.

The method according to any one of embodiments 47-50, wherein locomotion of the buoyant pumping platform on the body of water comprises the use of commands provided by a controller.

The method according to embodiment 51, wherein the controllers are in wireless communication with each other.

The method according to any one of embodiments 50-52, wherein the commands of one ore more of the controllers are provided by communications from an offsite control center and/or an offsite beacon controller.

The method according to any one of embodiments 47-53, further comprising returning buoyant loading platform to the primary site after discharging the raised sediment.

The method according to any one of embodiments 47-54, wherein the buoyant loading platform is docked to the buoyant pumping platform at the primary site.

The method according to embodiment 55, wherein the buoyant loading platform undocks from the buoyant pumping platform prior to moving to the secondary site.

The system according to embodiment 1, wherein the buoyant loading platform and the buoyant pumping platform each independently comprises a locomotion system that allows platforms to travel about the surface of the body of water.

The system according to embodiment 57, wherein the locomotion system of the buoyant loading platform is adapted to allow the loading platform to about a terrestrial surface.

The invention claimed is:

1. A system comprising:
a buoyant pumping platform capable of sediment removal operations, the platform comprising: at least one pumping device adapted to deploy to a detected location below a surface of a body of water where sediment is located, and raise the sediment, a locomotion system, a location device adapted to determine the detected location, and a first controller adapted to provide commands for the sediment removal operations, wherein the commands are determined autonomously by onboard software or semi-autonomously via communications received from an offsite location, wherein the autonomous or semi-autonomous commands operate responsive to receipt of a trigger signal, the trigger signal generated responsive to a docking operation.

2. The system according to claim 1, wherein the at least one pumping device comprises a suction device.

3. The system according to claim 1, wherein the commands are determined autonomously by onboard software.

4. The system according to claim 1, wherein the commands are determined semi-autonomously via communications received from the offsite location.

5. The system according to claim 4, wherein the communications are derived from at least one of a mobile device and a computer, via Wi-Fi, LTE, or radio frequency.

6. The system of claim 1, wherein the locomotion system of the buoyant pumping platform comprises wheels.

7. The system according to claim 1, further comprising a buoyant loading platform adapted to receive the sediment.

8. The system according to claim 7, wherein the buoyant loading platform comprises a second locomotion system.

9. The system of claim 8, wherein the locomotion system of the buoyant loading platform allows for transport of the received sediment to a secondary site.

10. The system of claim 8, wherein the buoyant loading platform comprises a second controller.

11. The system according to claim 1, wherein the location device comprises at least one of an echo sounder, a remote controller, and a GPS locater.

12. The system according to claim 2, wherein the suction device comprises a compressor, a suction hose, and an air hose.

13. The system according to claim 12, wherein the suction hose is adapted to coil, retract, collapse, or telescope.

14. The system according to claim 12, wherein the suction device further comprises an auger spike adapted to loosen the sediment at the detected location via agitation.

15. The system according to claim 7, wherein the buoyant pumping platform is adapted to deliver the raised sediment to the buoyant loading platform via a sediment exit tube in fluid connection with the at least one pumping device.

16. The system according to claim 7, wherein the buoyant loading platform is adapted to discharge the raised sediment in an aquatic environment or a terrestrial environment.

17. The system according to claim 1, further comprising at least one power source associated with the buoyant pumping platform, wherein the at least one power source is adapted to power the first controller, wherein the at least one power source is selected from at least one of a battery, a generator, and a photovoltaic device.

18. The system according to claim 1, wherein the locomotion system of the buoyant pumping platform comprises wheels.

19. The system of claim 1, wherein the locomotion system comprises the use of one or more paddle structures.

20. The system of claim 7, wherein the docking operation comprises docking of the buoyant loading platform with the buoyant pumping platform.

* * * * *